UNITED STATES PATENT OFFICE.

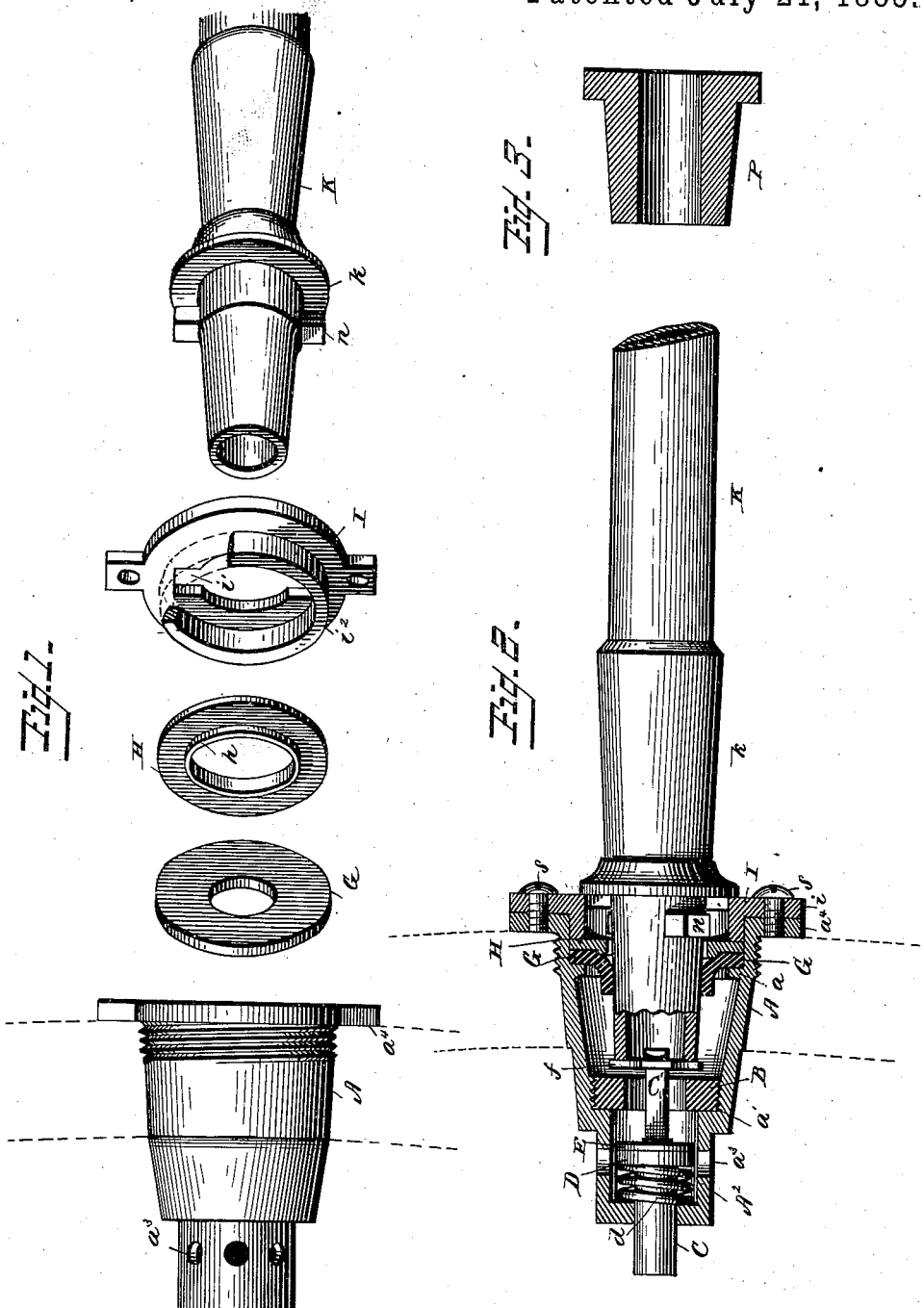

ROBERT M. REILLY AND FRANCIS KING, OF BALTIMORE, MARYLAND.

COMBINED BUNG AND FAUCET FOR ALE AND BEER BARRELS.

SPECIFICATION forming part of Letters Patent No. 322,853, dated July 21, 1885.

Application filed March 11, 1885. (No model.)

*To all whom it may concern:*

Be it known that we, ROBERT M. REILLY and FRANCIS KING, citizens of the United States, residing at Baltimore, in the county of Baltimore and State of Maryland, have invented certain new and useful Improvements in Combined Bung-Faucets for Ale and Beer Barrels; and we do hereby declare the following to be a full, clear, and exact description of the invention. such as will enable others skilled in the art to which it appertains to make and use the same.

Our invention relates to a combined bung-faucet for beer, ale, and other casks.

The object of the device is to provide a bung normally closed by a spring-valve and the gas-pressure of the contained liquid, and only opened by the introduction of the faucet.

The details of construction and operation of the several parts will be hereinafter fully set forth in the specification and pointed out in the accompanying drawings, in which—

Figure 1 is a detail perspective view of the several parts; Fig. 2, a transverse section of same, and Fig. 3 a modification of the rubber gasket.

Casks containing beer, ale, and kindred gaseous liquids are often provided with a permanent bung that admits the faucet. The trouble arising from permanent bungs is that leakage and waste take place when the faucet is introduced, which is not only a source of annoyance but loss. In order to remedy these defects we have provided the bung and faucet here shown.

The bung consists of a main stem, A, having two shoulders or flanges, $a\,a'$, and an integral extension, $A^2$, provided with a series of radial openings, $a^3$. A valve-stop, B, is secured to the inside of the bung at flange $a'$, and has an opening therein for the passage of the valve-rod C, having a cross-bar, $f$. Secured to this valve-rod is a valve, D, having a rubber or leather packing, E, and a spring, $d$, beneath said valve to automatically return the valve to its normal position.

A rubber gasket, G, rests on the flange $a$ of bung A, and upon this is placed a securing-plate, H, having a flange, $h$. (See Fig. 1.) This flange $h$ is, however, not essential and may be omitted. On top of this plate H is placed a collar, I, having the internal and downwardly-projecting flange, $i^2$, and transverse slot $i'$. This collar I, having an outwardly-projecting flange, $i$, is secured to flange $a$ of bung A by means of the screws $s$. The faucet K has an outwardly-flaring flange, O, and two locking-lugs, $n$, which lugs enter the recesses or slots $i'$ of collar I. The lugs $n$ prevent the beer from forcing out the faucet after the faucet has been given a quarter-turn so as to bring said lugs under the flange in the collar I. The flange $k$, after the faucet has been inserted, bears against the upper surface of collar I, and therefore limits the entrance of the faucet into the bung. Neither the lugs nor collar have any function in keeping the faucet tight, as the gasket acts as a tight packing and prevents loss of the contents or of gas. The collar $k$ prevents the faucet going in too far, and the lugs $n$ prevent the faucet being forced out.

The operation is as follows: Suppose the parts to be as in Fig. 1. The gasket G is placed within the bung and on shoulder or rim $a$, over which is placed the annular flanged plate H. The collar I is next secured in position by means of the screws $s$. Then the inner end of faucet, K, is forced into the bung, compressing the gasket G until it curves or bends downward and around the faucet end, as shown in Fig. 2. The lower end presses against bar $f$ of the valve-rod, pushing down the valve. The faucet is then given a quarter-turn, which brings the locking-lugs $n$ out of the groove $i'$ and under the interior flange of plate I, thus securely holding the faucet in position. The contained liquid can now flow through the openings $a^3$ around the exterior of valve D and upward into the bung, the gas-pressure acting to bind the gasket G closely to the interior end of the faucet, so as to make it perfectly tight. The liquid now flows freely into and through the faucet, and will continue to do so until the faucet has been removed by unlocking it. Instantly this is done the spring $d$ acts to force the valve D and packing E upward against valve-stop B and effectually closes the orifice leading to the faucet.

Instead of the gasket-plate G, consisting of a rubber disk, as shown in Fig. 1, we may use the form P. (Shown in Fig. 3.) We however prefer the disk shown in Fig. 1 as giving the best results.

The device is simple, compact, easily taken apart and removed, and affords a reliable guard against the flow of the liquid in the cask until the faucet is introduced, and prevents leakage or waste during the operation of introducing the faucet.

Having thus described our invention, what we claim as new, and desire to secure by Letters Patent, is—

1. A bung provided with two interior flanges, the upper one forming a seat for the gasket, the lower one forming a seat for the valve-stop, a valve-chamber, and radial openings thereto, in combination with a spring-valve having a bar, $f$, to receive the pressure of the faucet, the collar I, with its slots, flange, and exterior ears, the securing-plate H, and gasket G.

2. In a bung, a collar, I, provided with the internal and downwardly-projecting flange $i^2$ $i'$, having slots to receive the locking-lugs of the faucet, and exterior flanges, $i$, to secure the collar to the bung, securing-plate H, and gasket G, substantially as and for the purpose set forth.

3. The combination, with the flanged shell of the bung, of the gasket G, securing-plate H, and the internally flanged and slotted collar I, substantially as and for the purpose set forth.

4. The combination, with the bung, of the gasket G, fastening-plate H, and internally flanged and slotted collar I, and the faucet provided with two locking-lugs which enter the slots in the upper fastening-plate, and the flange $k$, substantially as and for the purpose set forth.

In testimony whereof we affix our signatures in presence of two witnesses.

ROBERT M. REILLY.
FRANCIS KING.

Witnesses:
J. H. MacDonald,
Newton B. Lovejoy.